US012792418B2

(12) United States Patent
Durazzo et al.

(10) Patent No.: US 12,792,418 B2
(45) Date of Patent: Nov. 10, 2026

(54) GLOBAL OPTIMIZATION OF QUANTUM PROCESSING UNITS

(71) Applicant: Dell Products L.P., Round Rock, TX (US)

(72) Inventors: Kenneth Durazzo, Morgan Hill, CA (US); Stephen J. Todd, North Andover, MA (US); Michael Robillard, Shrewsbury, MA (US); Victor Fong, Melrose, MA (US); Brendan Burns Healy, Whitefish Bay, WI (US); Benjamin Santaus, Somerville, MA (US)

(73) Assignee: Dell Products L.P., Round Rock, TX (US)

( * ) Notice: Subject to any disclaimer, the term of this patent is extended or adjusted under 35 U.S.C. 154(b) by 760 days.

(21) Appl. No.: 17/811,344

(22) Filed: Jul. 8, 2022

(65) Prior Publication Data

US 2024/0012691 A1 Jan. 11, 2024

(51) Int. Cl.
*G06F 9/50* (2006.01)

(52) U.S. Cl.
CPC ............ *G06F 9/5066* (2013.01); *G06F 9/505* (2013.01)

(58) Field of Classification Search
CPC ............................... G06F 9/5066; G06F 9/505
See application file for complete search history.

(56) References Cited

U.S. PATENT DOCUMENTS

| | | | | |
|---|---|---|---|---|
| 4,914,570 | A * | 4/1990 | Peacock | G06F 9/4856 709/201 |
| 6,714,960 | B1 | 3/2004 | Bitar et al. | |
| 10,817,337 | B1 * | 10/2020 | Richardson | G06F 9/50 |
| 11,170,137 | B1 * | 11/2021 | Richardson | G06F 30/20 |
| 11,270,220 | B1 * | 3/2022 | Richardson | G06F 9/5044 718/104 |
| 11,663,051 | B2 | 5/2023 | Vasileiadis et al. | |
| 12,032,888 | B2 | 7/2024 | Doi | |
| 2009/0070550 | A1 | 3/2009 | Solomon | |
| 2011/0161965 | A1 * | 6/2011 | Im | G06F 9/5038 718/102 |
| 2011/0307437 | A1 | 12/2011 | Aliferis et al. | |
| 2016/0357676 | A1 | 12/2016 | Cain et al. | |
| 2018/0308000 | A1 * | 10/2018 | Dukatz | G06N 10/60 |
| 2018/0375784 | A1 | 12/2018 | Balakrishnan et al. | |
| 2019/0213509 | A1 | 7/2019 | Burleson et al. | |
| 2019/0243682 | A1 | 8/2019 | Botelho | |
| 2020/0201655 | A1 | 6/2020 | Griffin et al. | |
| 2021/0073028 | A1 * | 3/2021 | Li | G06F 9/5011 718/102 |
| 2021/0158425 | A1 * | 5/2021 | Kasprowicz | G06F 9/5044 |
| 2021/0294644 | A1 | 9/2021 | Nott | |
| 2021/0357278 | A1 * | 11/2021 | Lee | G06F 9/5044 |
| 2022/0383171 | A1 * | 12/2022 | Griffin | G06F 1/3203 713/323 |

(Continued)

*Primary Examiner* — Aimee Li
*Assistant Examiner* — Harrison Li
(74) *Attorney, Agent, or Firm* — Workman Nydegger

(57) ABSTRACT

Global optimization of quantum jobs in a multi-cloud or multi-edge environment is disclosed. The quantum jobs of multiple vendors are consolidated in a telemetry plane. The quantum jobs are evaluated based on user intents, quantum job characteristics, and quantum processing unit characteristics. The quantum jobs are then assigned to the quantum systems of the vendors based on the evaluation.

18 Claims, 7 Drawing Sheets

(56) References Cited

U.S. PATENT DOCUMENTS

| | | | | |
|---|---|---|---|---|
| 2022/0398129 | A1 | 12/2022 | Bishop et al. | |
| 2022/0414509 | A1 | 12/2022 | Haah | |
| 2023/0066093 | A1* | 3/2023 | Coady | G06N 10/00 |
| 2023/0110628 | A1 | 4/2023 | Heckey et al. | |
| 2023/0140809 | A1 | 5/2023 | Palop et al. | |
| 2023/0315539 | A1 | 10/2023 | Scheps et al. | |
| 2023/0342652 | A1 | 10/2023 | Haverkamp et al. | |
| 2024/0378085 | A1* | 11/2024 | Ravi | G06F 9/5027 |
| 2024/0394414 | A1 | 11/2024 | Radha et al. | |

* cited by examiner

| State or Time 402a | |
|---|---|
| Wait Score | -0.75 |
| Execution Time Score | -10.23 |
| System Utilization Score | -0.23 |
| Budget Score | 1.73 |
| Overall Score | -100.3 |

502

| State or Time 402b | |
|---|---|
| Wait Score | 0.3 |
| Execution Time Score | 0.27 |
| System Utilization Score | 0.25 |
| Budget Score | 0.1 |
| Overall Score | 0.52 |

504

Figure 5

GLOBAL OPTIMIZATION OF QUANTUM PROCESSING UNITS

RELATED APPLICATIONS

This application relates to application Ser. No. 17/811,339, entitled QUANTUM JOB SUBMISSION AND OPTIMIZATION FOR END-TO-END ALGORITHMS and filed the same day as the present application, which application is incorporated by reference in its entirety.

FIELD OF THE INVENTION

Embodiments of the present invention generally relate to quantum computing systems and to executing quantum jobs. More particularly, at least some embodiments of the invention relate to systems, hardware, software, computer-readable media, and methods for orchestrating the execution of hybrid applications and/or quantum jobs.

BACKGROUND

Hybrid quantum computing generally refers to the concept of using both classical computing systems (processors, memory) and quantum computing systems to perform or execute algorithms. A hybrid quantum algorithm (hybrid algorithm or process) typically includes classical computing portions and quantum portions. For example, the computing portion may execute and generate a result or output that serves as the input to the quantum portion of the hybrid process.

The quantum portion of a hybrid process or algorithm may be outsourced to a quantum vendor or provider. The quantum provider may provide quantum services, or Quantum as a Service (QaaS), to multiple users and has an incentive to maximize use of their quantum computing system(s). The ability to maximize or at least improve the use of a quantum computing system, specifically a quantum processing unit, is complicated for a provider. Users face a similar problem of selecting an appropriate quantum processing unit.

When executing a hybrid process or more specifically when executing the quantum portion of the hybrid process, a user may have the ability to choose a QaaS vendor. There are many different QaaS vendors and each QaaS vendor may provide different quantum processing unit capabilities, availabilities, rates, and the like. In addition to considering the characteristics of the QaaS vendors, the user must also consider their own criteria such as budget, execution deadline, and the like. As such, choosing a quantum service vendor in an informed manner is difficult.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 5 discloses aspects of scoring performed in assigning or placing quantum jobs;

DETAILED DESCRIPTION OF SOME EXAMPLE EMBODIMENTS

Embodiments of the present invention generally relate to quantum processing systems. More particularly, at least some embodiments of the invention relate to systems, hardware, software, computer-readable media, and methods for quantum processing operations including quantum job placement operations, real-time quantum job placement operations, quantum job-quantum processing matching operations, job queue management operations, global queue operations, and the like.

Embodiments of the invention relate to a mechanism that allows the execution of quantum jobs in a heterogeneous setting. In such a setting, there are a wide variety of QaaS (Quantum as a Service) providers. The providers may be edge-based, cloud based, or the like. Each provider may have their own quantum systems and/or other accelerators. The providers as a whole, or individually, may provide Quantum Processing Units (QPU), virtual QPU (vQPU), graphics processing units (GPU) or the like or combinations thereof.

Each of these quantum systems may have different characteristics. These characteristics may include, but are not limited to, availability, runtime environments, confidence factors, qubits available, confidence scores, accuracy scores, or the like or combination thereof.

An orchestration engine is disclosed that is configured to identify which provider and/or which quantum processing unit provided by that vendor, whether real or virtual, is likely to satisfy a user intent. The user intent may, by way of example, include budget, end-to-end wait time, execution completion time, accuracy (error rate), quantum processing unit type, or the like or combinations thereof.

Embodiments of the invention can place or orchestrate workloads that include a single quantum job (e.g., a single quantum circuit), end-to-end algorithms, which may include iterative quantum jobs, end-to-end algorithms with future job prediction, or the like. Further, embodiments of the invention can be implemented in execution locations including on-premise quantum systems, edge quantum systems, cloud quantum systems, or the like.

Quantum jobs are often performed in the context of hybrid applications. A hybrid application or process often includes computer portions that execute in classical computing hardware (processors, memory, etc.) and quantum portions that execute in QPUs or vQPUs (a vQPU is computing hardware configured to emulate a real QPU). These hybrid applications are thus executed in hybrid environments, which environments may include a classical computing system and a quantum processing system.

Figure 1:
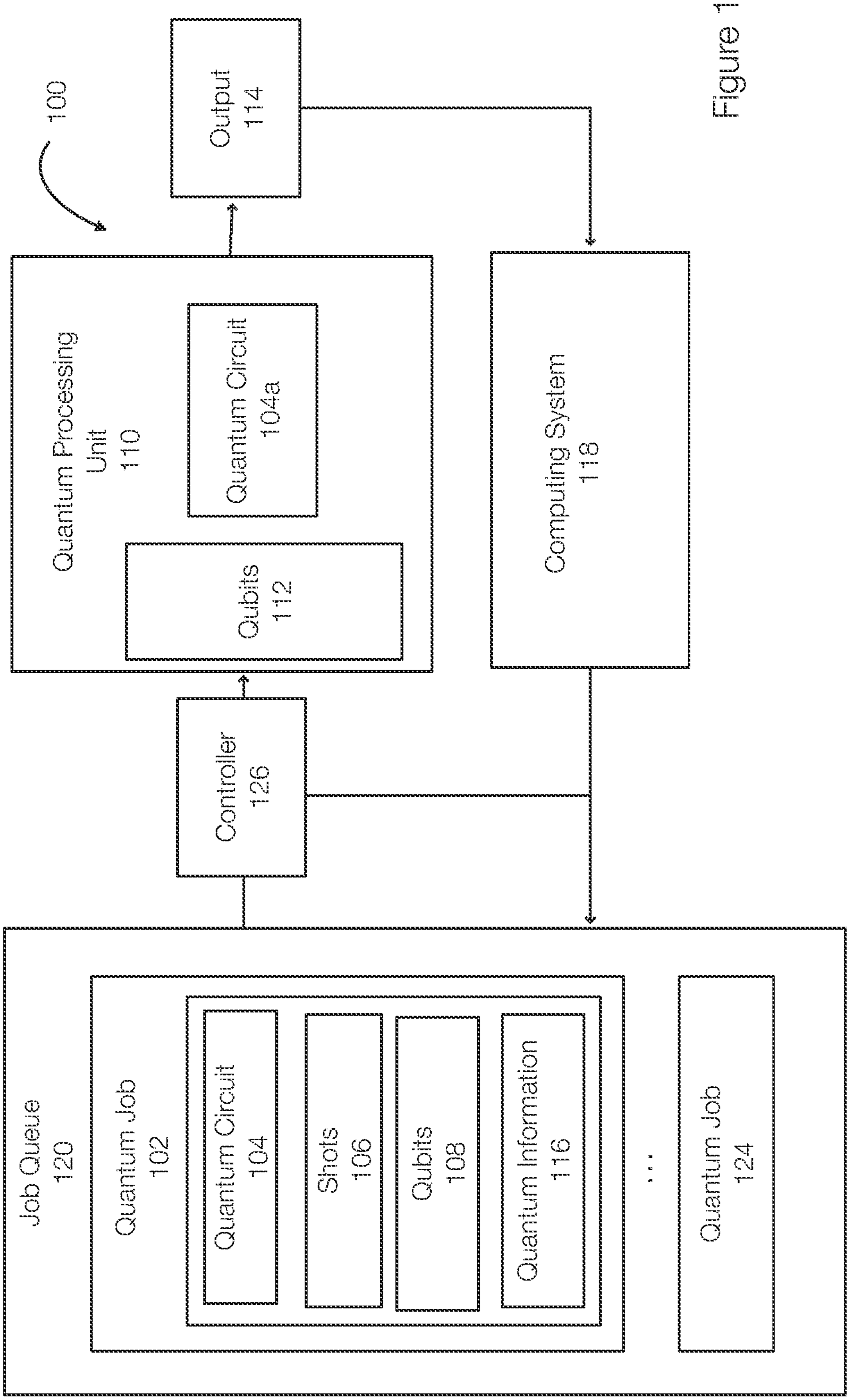
FIG. 1 discloses aspects of a hybrid system that includes a computing system, a quantum processing unit, and a job queue associated with the quantum processing unit.

FIG. 1 discloses aspects of performing a quantum job in a quantum computing system. FIG. 1 illustrates a hybrid system 100 that includes or has access to a quantum processing unit 110 (part of a quantum computing system). The quantum processing unit 110 may include or have access to computing hardware that manages the job queue 120, provides the input (e.g., a quantum job) to the quantum processing unit 110 and that receives the output 114 of the quantum processing unit 110.

The hybrid system 100 may also include or have access to a computing system 118 (processors, memory, network hardware, etc.). The computing system 118 and/or the quantum processing unit 110 may be associated with different providers, owners, users, or the like. In some examples, a user may be associated with the computing system 118. When the user executes a hybrid process, quantum jobs of the hybrid process may be sent to and executed by the quantum processing unit 110.

The computing system 118 may feed or input a quantum job to the quantum processing unit 110 and may also be an interface between the quantum processing unit 110 and other remote compute/quantum computing systems. In addition, the quantum processing unit 110 may be remote from the computing system 118.

In one example, the computing system 118 may interact with the quantum processing unit 110 via a controller 126 and/or the job queue 120. Quantum jobs may be submitted to the job queue 120 by the computing system 118 or by the controller 126. When a specific quantum job is ready for execution, the computing system 118 may provide the quantum job (qubits, shots, quantum circuit) to the controller 126, which inputs the quantum job to the quantum processing unit 110. The controller 126 may transpile the quantum job. The controller 126, which may submit the quantum jobs from the job queue 120 to the quantum processing unit 110, may prompt the computing system 118 to provide the details or substance of the quantum job.

The quantum processing unit 110 includes qubits 112. The number of qubits 112 is typically fixed. The quantum processing unit 110 may handle any quantum circuit that is configured for a number of qubits equal to or less than the number of qubits 112. In some instances, some of the qubits 112 of the quantum processing unit may go unused when the quantum job 102 requires less than all of the qubits 112 of the quantum processing unit 110. This may allow the quantum processing unit 110 to execute another quantum job at the same time as long as the necessary qubits are available and when the two (or more) quantum jobs can operate independently (e.g., are not entangled).

The computing system 118 may maintain or have access to the job queue 120 of the quantum processing unit 110 via the controller 126. The controller 126 may submit a quantum job to the quantum processing unit 110. In this example, the job queue 120 includes a quantum job 102 and a quantum job 124, which are representative of any number of quantum jobs. The quantum job 102, by way of example, may include or reference a quantum circuit 104, shots 106, qubits 108, time constraints, and other quantum information 116.

The quantum circuit 104 may define how qubits are initialized, number of qubits, a sequence of quantum operations, shots, depth, quantum measurements, and the like. The quantum circuit 104 may or may not entangle at least some of the qubits. The shots 106 is the number of times that the quantum circuit 104 is to be executed by the quantum processing unit 110. The qubits 108 is the number of qubits required or specified for the quantum job 102. The quantum information 116 may include quantum processing unit model expected by the user, pricing, budget, or the like.

When the quantum processing unit 110 is ready to perform the next quantum job and the next quantum job is the quantum job 102, the quantum job 102 is retrieved from the job queue 120 or requested from the computing system 118 if the job queue 120 stores quantum job placeholders. More specifically, when the quantum jobs in the job queue 120 are only placeholders, the computing system 118 will be prompted to submit the quantum job 102 to the quantum processing unit 110 at or near the time for circuit execution. The quantum processing unit 110 is initialized with the quantum circuit 104 (represented as quantum circuit 104*a*). Once the quantum circuit 104*a* is prepared and initialized in the quantum processing unit 110, the specified number of shots 106 of the quantum circuit 104*a* are performed iteratively.

Each shot generates an output 114. More specifically, each shot results in a bitstring whose length is equal to the number of qubits 108. The output 114 commonly includes a distribution of bitstrings. The output 114 is received by the computing system 118. Once the output 114 for the quantum job 102 is received, the computing portion of the hybrid process executes using the output 114. When completed, the next quantum job of the hybrid process, which may be the quantum job 124, may be executed by the quantum processing unit 110.

Although FIG. 1 illustrates example relationships between the computing system 118, the quantum processing unit 110, and the controller 126, other arrangements are possible. For example, both the computing system 118 and the quantum processing unit 110 may be cloud or edge-based systems. Providers or vendors may provide hybrid systems for hybrid applications. Client devices (or the computing system 118) may access the controller 126, the job queue 120, or the quantum processing unit 110 using an API (Application Programming Interface). The job queue 120 may be accessed by the computing system 118 via the controller 126.

Figure 2:
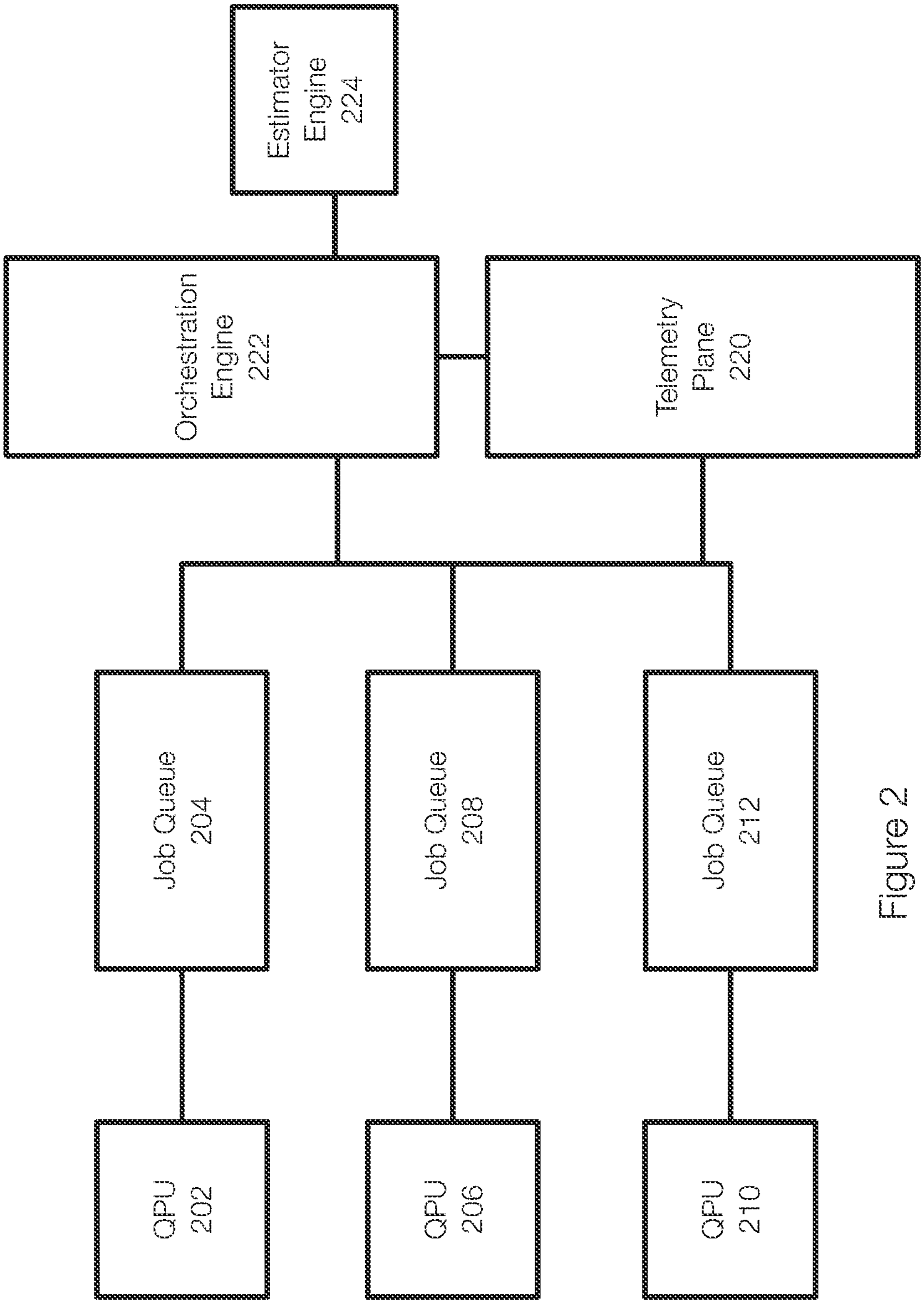
FIG. 2 discloses aspects of consolidating the queue status of multiple QPU vendors in a telemetry plane.

FIG. 2 discloses aspects of a telemetry plane. FIG. 2 illustrates QPUs 202, 206, and 210, which are representative of multiple QaaS providers and multiple accelerators of different types, including QPUs and vQPUs. The QPU 202 is associated with a job 204. Similarly, the QPU 206 and the QPU 210 are associated, respectively, with the job queue 208 and the job queue 212.

By way of example, the job queue 204 may store or reference quantum jobs that have been submitted to the QPU 202. Over time, the QPU 202 will perform or execute the quantum jobs in the job queue 204.

In order to optimize, prioritize, place, and/or orchestrate the execution of quantum jobs from a global perspective, an orchestration engine 222 is provided. The orchestration engine 222 is configured to provide or is associated with a telemetry plane 220. The telemetry plane 220 is configured to consolidate the queue status of the job queues 204, 208, and 212. In one example, the QPUs 202, 206, and 210 (or their owners or the vendors) may publish the status of their respective job queues 204, 208, and 212 to the telemetry plane 220. For example, the QPU 202 may write or publish a status of the job queue 204 to the telemetry plane 220. Alternatively, the QPU 206 may provide an application programming interface such that the orchestration engine 222 can query the job queue 208 to retrieve its status.

The status of the job queue 204 may include various information about each of the quantum jobs in the job queue

204. This may include information such as circuit configuration, number of shots, qubits required, quantum circuit depth, budget, or the like.

The status may include information that allows the run-time characteristics of the quantum job to be determined or predicted. The orchestration engine 222 may include or have access to an estimator engine 224. The estimator engine 224, which may be a machine learning model, may be configured to predict runtime characteristics of the quantum jobs reflected or referenced in the telemetry plane 220. More specifically, QPUs can differ from each other in terms of clock speed, error rate, qubit volume, entanglement characteristics (how many qubits can be entangled), or the like. The estimator engine 224 can use at least these factors or features to predict the runtime characteristics of the quantum jobs. The runtime characteristics can be generated for different QPU configurations, QPU types, or the like.

When a hybrid application is being executed, the hybrid application may include a series of quantum jobs. In other words, the number and characteristics can be determined in advance and stored in the relevant job queue. These quantum jobs may be referred to as future quantum jobs. In any event, all quantum jobs in the telemetry plane are associated with sufficient information that allow them to be orchestrated as disclosed herein.

Because the orchestration engine 222 may reassign quantum jobs from one quantum processing unit to another quantum processing unit (or from one vendor to another), some of the characteristics or information in the status may include financial information such as expected revenue and/or revenue splitting information. The participating vendors may agree to fee sharing in the event a quantum job is reassigned to a different vendor.

Figure 3:
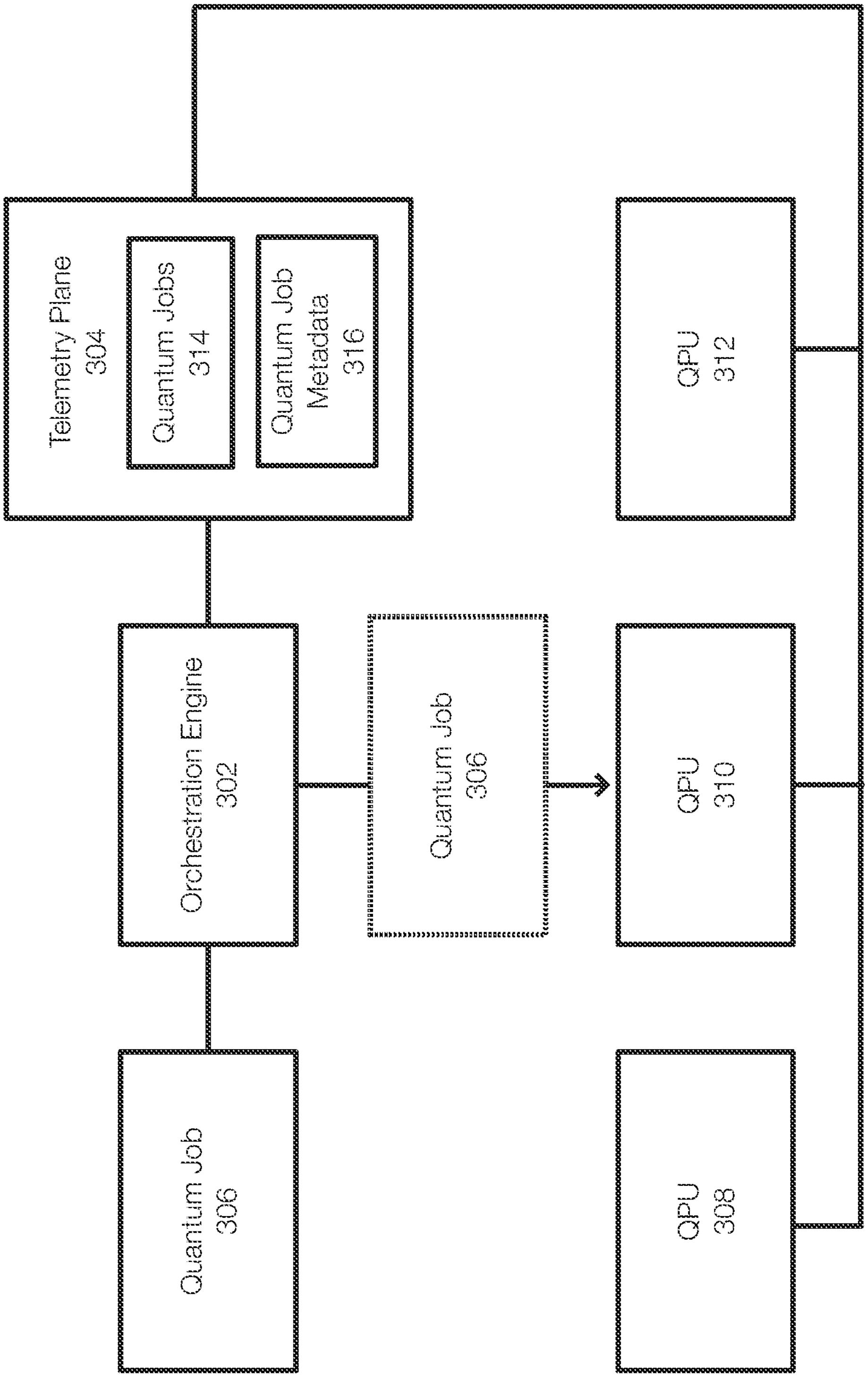
FIG. 3 discloses aspects of placing a quantum job with a QPU and discloses aspects of assigning quantum jobs consolidated in the telemetry plane to QPUs.

FIG. 3 discloses aspects of orchestrating a quantum job or of placing a quantum job. FIG. 3 illustrates an orchestration engine 302 associated with a telemetry plane 304. As previously described, the telemetry plane 304 may consolidate the queue status for each of the QPUs 308, 310, and 312. Thus, the telemetry plane 304 stores or has access to metadata 316 describing the quantum jobs 314, which reflect the quantum jobs in the job queues of the QPUs 308, 310, and 312. Stated differently, the quantum job metadata 316 describes or is associated with the quantum jobs 314, which represents the quantum jobs being handled by all of the registered QPUs.

In one example, the quantum job metadata 316 may also include information describing the characteristics of the QPUs 308, 310, and 312. This may include type, qubits, speed, accuracy, or the like.

The orchestration engine 302 can determine runtime characteristics for each of the quantum jobs 314 using the quantum job metadata 316. Using the information available in the telemetry plane 304, the orchestration engine 302 can place the quantum job 306. This may be achieved by matching or comparing characteristics of the quantum job 306 with the characteristics of the QPUs 308, 310, and 312. In this example, the quantum job 306 is placed at the QPU 310.

More generally, the orchestration engine 302 can manage the quantum jobs 314 to orchestrate the execution of the quantum jobs 314 across all of the available QPUs, represented by the QPUs 308, 310, and 312. The orchestration engine 302, in addition, includes a mechanism to continuously learn from the performance of the execution of the various QPUs 308, 310, and 312 to better optimize for future quantum job execution and/or placement.

Figure 4:
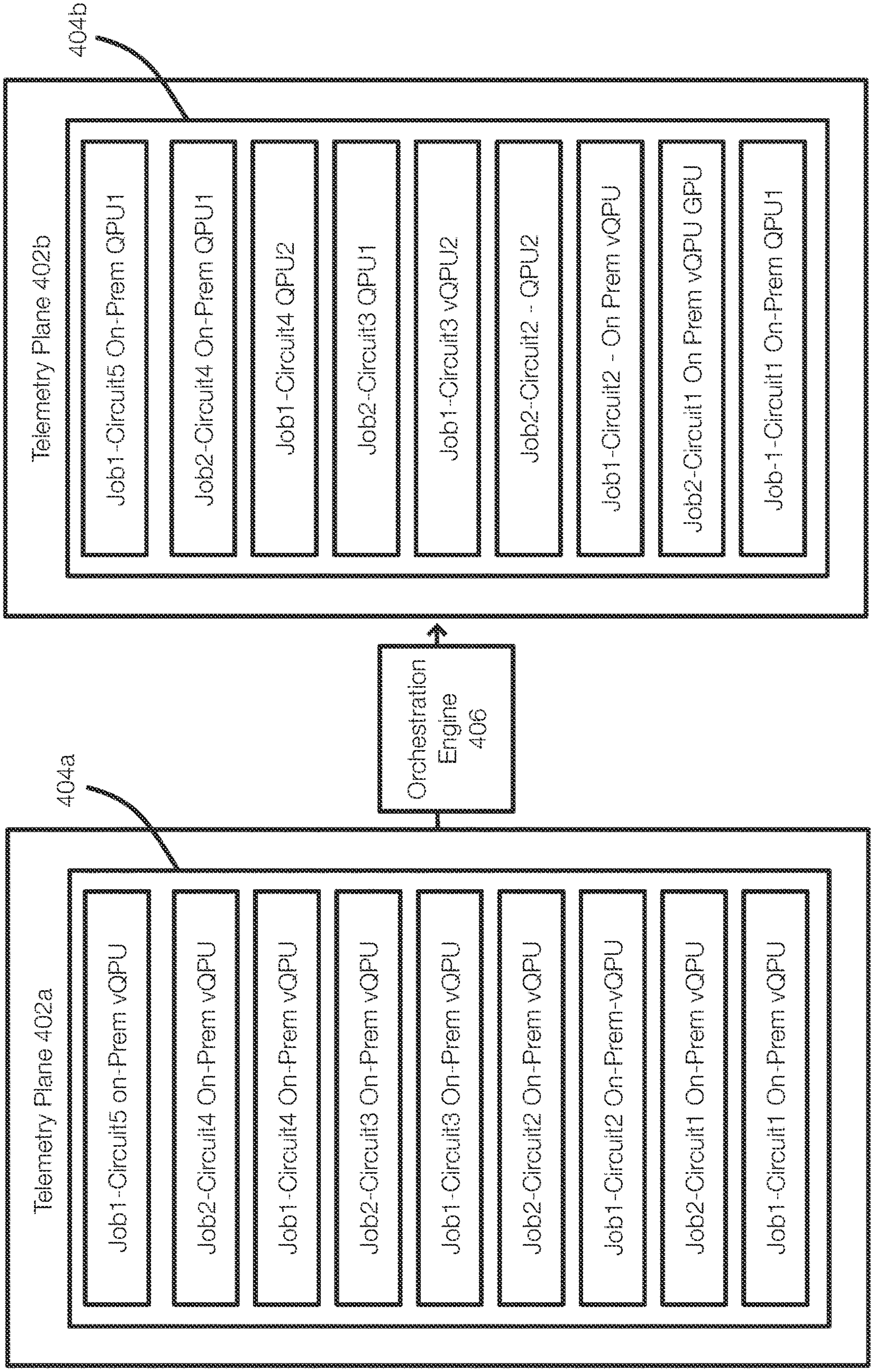
FIG. 4 discloses aspects of making QPU assignments for quantum jobs consolidated in a telemetry plane.

FIG. 4 discloses aspects of the telemetry plane and illustrates how the quantum jobs are placed or orchestrated when multiple quantum vendors are available. FIG. 4 illustrates a telemetry plane 402*a*, which corresponds to a point in time or a first state. The telemetry plane 402*b* corresponds to the telemetry plane 402*a* at a later point in time or a second state. The orchestration engine 406 has changed the placements of the quantum jobs, as reflected in the orchestration of the quantum jobs 404*a* compared to the subsequent orchestration of the quantum jobs 404*b*.

In the example of FIG. 4, for simplicity, it is assumed that the quantum jobs 404*a* all come from or are currently present in a job queue of an on-premise vQPU. The quantum jobs 404*a* include quantum jobs associated with two different applications. Application 1 or App1 includes job1-circuit1 to job1-circuit5. App2 includesjob2-circuit1 to job2-circuit4. The App1, on initiation, may have determined that 5 quantum circuits or quantum jobs would be required. The App2 similarly determined that 4 quantum circuits or jobs would be required.

The quantum jobs of App1 are iterative, which indicates that the execution of a future quantum job depends on the execution of a previous quantum job (and/or results of an intervening computer portion).

The orchestration engine 406 operates on the quantum jobs 404*a* to place the quantum jobs at a more optimum location. For example, the job1-circuit3 is moved from the on-Prem vQPU to a vQPU of a different vendor (vQPU2). The job1-Circuit4 is moved from the on-Prem vQPU to a QPU of a different vendor (QPU2). Other placements or quantum job movements are reflected in FIG. 4. Moving a quantum job from one quantum processing unit to another quantum processing unit does not require that the quantum processing units be the same or of the same type. Thus, quantum jobs initially placed on a vQPU can be moved to a physical QPU and vice-versa. The orchestration engine 406 can make placement decisions in the context of multiple QPU (or QaaS) vendors.

When an end-to-end application is started, user intents such as execution deadline, accuracy, confidence, cost, or the like can be defined or determined and submitted to the orchestration engine 406. In addition to publishing the quantum jobs of the application to the telemetry plane and providing the user intents to the orchestration engine 406, the runtime characteristics of these quantum jobs can be determined by the orchestration engine 406 using an estimator engine.

The orchestration engine 406 also has access to vendor information such as QPU type (semi-conductor versus trapped ion or physical versus virtual), network latency, error rate, queue wait-time, cost, or the like.

For example, a user's budget may require job1-Circuit4 to be executed on the QPU2 rather than the On-Prem vQPU. Thus, the orchestration engine 406 may move the job to the QPU2. In another example, the execution deadline may require the orchestration engine 406 to move a quantum job to a faster QPU. In another example, the orchestration engine 406 may move or place a quantum job on a particular QPU based on an accuracy requirement. These factors, which influence placement, can be considered individually, collectively, in subsets, in a weighted manner, or the like.

In addition, the process of selecting a QPU on which to place a quantum job may also depend on characteristics of the quantum circuit. For example, the orchestration engine 406 may ensure that the entanglement characteristics of a vendor's QPU match the requirements of the circuit. This is relevant because QPUs can differ in terms of clock speed, error rate, qubit volume, entanglement characteristics, or the like. As previously stated, accuracy requirements may also be considered as different QPUs may have different accuracies.

In another example, the orchestration engine 406 may split quantum circuits into pieces that can be executed separately and/or at different QPUs. The results of these independent executions can be aggregated after execution.

In one example, the orchestration engine 406 considers vendor criteria such a QPU machine type, network latency, error rate, queue wait-time, cost, and the like against user intents such as budget, execution deadline, accuracy, QPU, end-to-end wait time, or the like. Quantum jobs are placed based on this comparison or based on how the user intents match the vendor criteria. This comparison or information allows quantum to be orchestrated across multiple vendors based on circuit requirements, user intents, real-time QPU vendor telemetry, runtime characteristic predictions, or the like across on-premise, edge, and cloud-based quantum systems.

The quantum jobs 404*a*, 404*b* in the telemetry planes 402*a*, 402*b* may also be scored individually or collectively according to various characteristics such as wait score, execution time score, system utilization score, budget score, and overall score.

FIG. 5 illustrates a comparison of the scores of the telemetry plane 402*a* and the telemetry plane 402*b*. FIG. 5 illustrates various scores associated with the telemetry plane 402*a* and with the telemetry plane 402*b*. As illustrated, the scores of the telemetry plane 402*b* are improved. The scores may be based on how the characteristics of the quantum jobs compare to the characteristics of the assigned QPU. Moving, for example, the job2-Circuit2 from the On-Prem vQPU to the QPU of another vendor (QPU2) may improve one or more of the wait score, the execution time score, the system Utilization Score, and/or the Budget score. These scores may be generated in different manners. By way of example only, each of these scores may be associated with a worst case and a best case (which may be determined using historical information or based on user-defined terms) and the score can be assigned using a linear relationship. For example, the wait score may be associated with a best case time of 5 hours and a worst case time of 25 hours. If the wait score is on a scale of 0 (best case) to 100 (worst case), an expected wait time of 9 hours may receive a wait score of 20. Other scores can be similarly determined. The overall score may be an average of these individual scores or a weighted average. Further, the best and worst case characteristics may change over time as characteristics change.

Embodiments of the invention allow quantum jobs (or quantum circuits) to be placed as a runtime decision based on circuit requirements, user intents, real-time QPU vendor telemetry, runtime characteristic prediction or the like.

In one example, the placement or assignments may be continually reevaluated and may change before any specific quantum job is actually executed. Changes may occur due, for example, to changes in the characteristics used to make placement or orchestration decisions, such as real-time QPU telemetry, the availability of qubits, or changes in other characteristics discussed herein.

Figure 6:
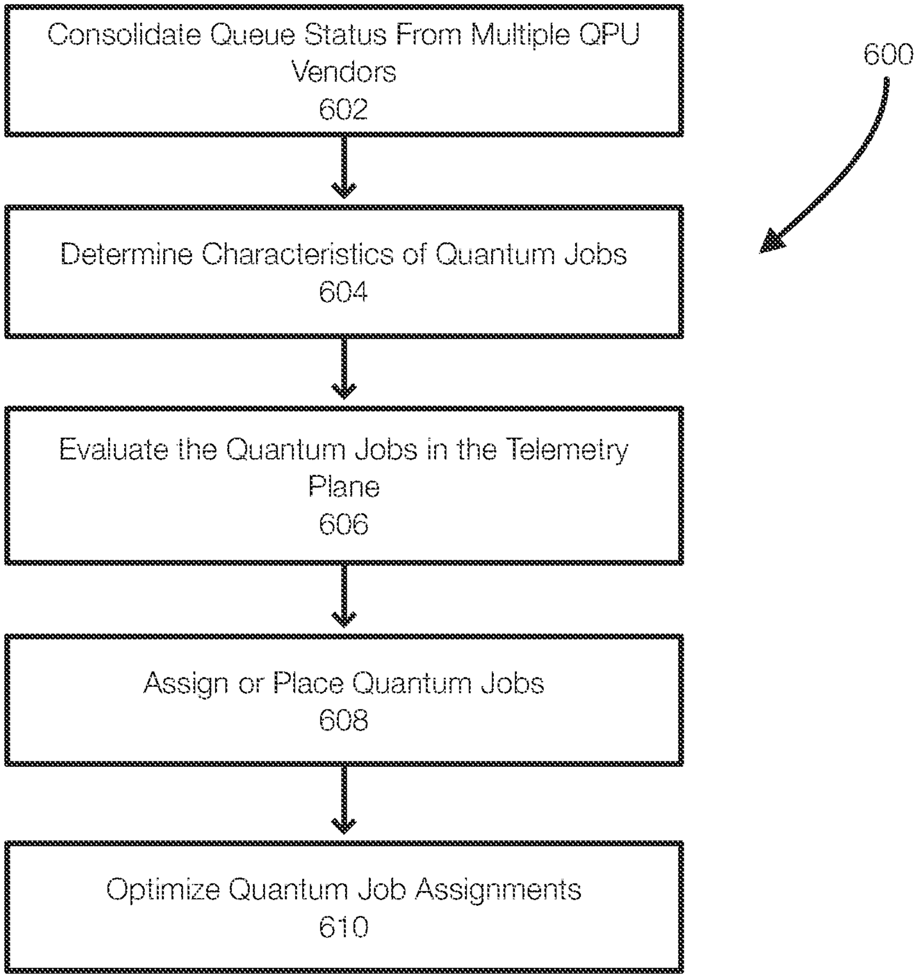
FIG. 6 discloses aspects of placing quantum jobs with multiple QPU vendors.

FIG. 6 discloses aspects of placing or orchestrating quantum jobs on a global scale. In the method 600, job queue status is received from multiple QPU vendors and consolidated 602 in a telemetry plane. The queue status information may identify the quantum jobs in the job queues on the various QPUs, and other information. Using the queue status, the characteristics of each of the consolidated quantum jobs may be predicted or determined 604.

Next, the quantum jobs that are consolidated in the telemetry plane are evaluated 606. The evaluation allows an orchestration engine to consider the characteristics of the quantum jobs, the characteristics of the QPUs provided by the QPU vendors, and/or user intents to make assignments that optimize one or more aspects of the QPUs and/or the quantum jobs as a whole. For example, the orchestration engine may be configured to optimize placement or orchestration for cost, wait time, execution completion time, accuracy, or the like or combination thereof. The orchestration engine then assigns or places 608 the quantum jobs, as illustrated in the placements made in the telemetry plane 402*b* compared to the initial assignments in the telemetry place 402*a*. The assignments or placements are continually optimized 610 at least because of changing conditions or characteristics in the QPUs registered with the telemetry plane.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, quantum operations, quantum management operations such as quantum job assignment or placement operations, quantum job scoring operations, quantum job consolidation operations, or the like. More generally, the scope of the invention embraces any operating environment in which the disclosed concepts may be useful.

At least some embodiments of the invention provide for the implementation of the disclosed functionality in platforms such as Qiskit DELL Runtime. In general, however, the scope of the invention is not limited to any particular quantum platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud or edge computing environments, which may or may not be public, include environments that may provide quantum functionality for one or more clients.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers or virtual machines (VMs).

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: consolidating a queue status of each job queue associated with quantum processing units in a telemetry plane, determining characteristics for quantum jobs represented in the queue statuses, evaluating user intents associated with the quantum jobs and vendor criteria to generate placement recommendations for each of the quantum jobs, assigning the quantum jobs to the quantum processing units associated with the placement recommendations, and orchestrating the execution of the quantum jobs at the assigned quantum processing units.

Embodiment 2. The method of embodiment 1, further comprising receiving the queue status from each of the job queues.

Embodiment 3. The method of embodiment 1 and/or 2, wherein the user intents include one or more of execution deadline, accuracy, confidence, budget, and QPU type.

Embodiment 4. The method of embodiment 1, 2, and/or 3, wherein the vendor criteria include one or more of circuit requirements, real-time quantum processing unit telemetry, and runtime characteristics.

Embodiment 5. The method of embodiment 1, 2, 3, and/or 4, further comprising predicting the runtime characteristics for each of the quantum jobs in each available quantum processing unit.

Embodiment 6. The method of embodiment 1, 2, 3, 4, and/or 5, further comprising assigning the quantum jobs based on entanglement characteristics of the quantum processing units that match the quantum jobs.

Embodiment 7. The method of embodiment 1, 2, 3, 4, 5, and/or 6, further comprising splitting at least one of the quantum jobs into multiple circuits and assigning the multiple circuits to one or more of the quantum processing units.

Embodiment 8. The method of embodiment 1, 2, 3, 4, 5, 6, and/or 7, further comprising aggregating results generated from executing the multiple circuits.

Embodiment 9. The method of embodiment 1, 2, 3, 4, 5, 6, 7, and/or 8, further comprising optimizing the placement recommendations and reassigning the quantum jobs to the quantum processing units.

Embodiment 10. The method of embodiment 1, 2, 3, 4, 5, 6, 7, 8, and/or 9, wherein the quantum processing units include one or more of on-premise quantum processing units, edge based quantum processing units, and cloud based quantum processing units, wherein types include physical quantum processing units and virtual quantum processing units.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
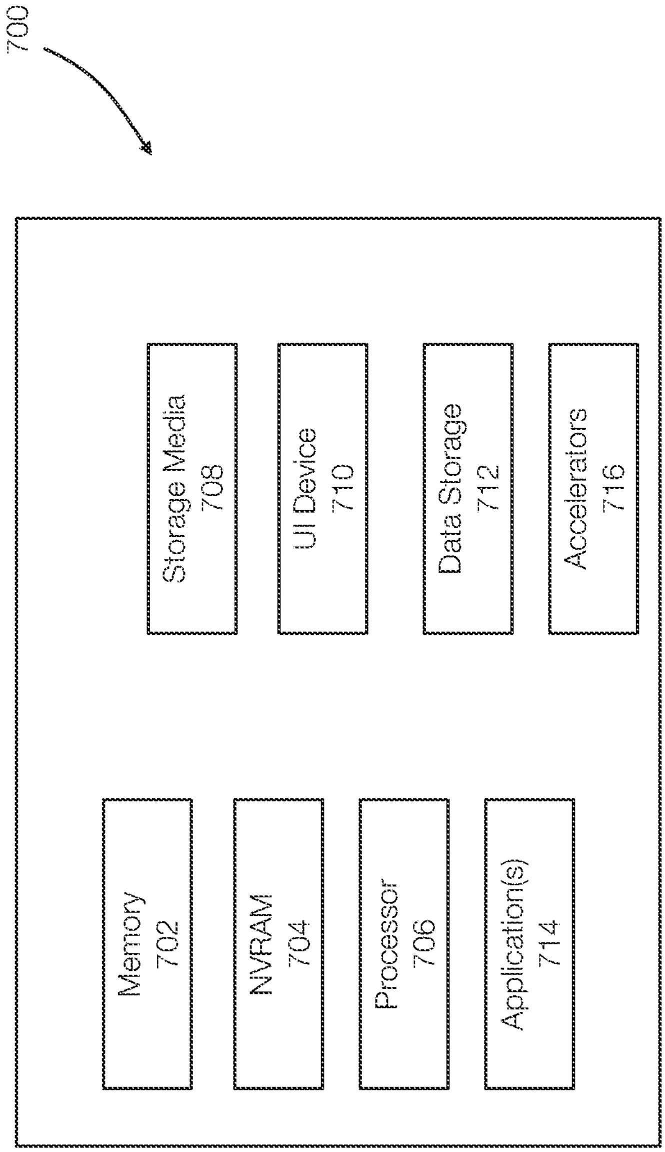
FIG. 7 discloses aspects of a hybrid computing system or hybrid computing entity.

With reference briefly now to FIG. 7, any one or more of the entities disclosed, or implied, by the Figures, and/or elsewhere herein, may take the form of, or include, or be implemented on, or hosted by, a physical computing device, one example of which is denoted at 7. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random-access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein. The computing device 700 may include, be associated with, or have access to accelerators 716 such as quantum processing units, virtual quantum processing units, Field Programmable Gate Arrays, graphics processing units, or the like.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

consolidating, in a telemetry plane that aggregates real-time queue status from a plurality of quantum vendors, a queue status of each job queue associated with quantum processing units in the telemetry plane, wherein each of the job queues includes quantum jobs for corresponding quantum processing units, wherein the telemetry plane identifies quantum jobs for all quantum processing units and stores metadata describing the quantum jobs and characteristics of the quantum processing units including quantum processing unit type, qubits, speed, accuracy, queue wait-time, and cost;

determining characteristics for the quantum jobs represented in the queue statuses included in the telemetry plane, wherein the characteristics include runtime characteristics predicted by an estimator engine and quantum vendor-specific quantum processing unit characteristics including qubit error rates, clock speeds, and entanglement limits, wherein the estimator engine predicts runtime characteristics for the quantum jobs for different quantum processing unit configurations using the metadata stored in the telemetry plane;

evaluating user intents associated with the quantum jobs, the characteristics, and vendor criteria in combination with a scoring mechanism to generate placement recommendations for each of the quantum jobs, wherein the user intents comprise one or more of budget, execution deadline, end-to-end wait time, execution completion time, accuracy, and quantum processing unit type, and wherein the vendor criteria comprise one or more of network latency, error rate, queue wait-time, and cost;

assigning the quantum jobs to the quantum processing units associated with the placement recommendations, wherein the assigning the quantum jobs includes selectively reassigning, before execution, at least one quantum job from a first quantum processing unit associated with a first quantum vendor to a second quantum processing unit associated with a second quantum vendor based on updated placement recommendations generated using the telemetry plane metadata and the predicted runtime characteristics; and orchestrating the execution of the quantum jobs at the assigned quantum processing units, wherein the quantum jobs are executed at the assigned quantum processing units, wherein assignments of the quantum jobs are continually reevaluated and changed before execution of the quantum jobs based on changes in real-time quantum processing unit telemetry and qubit availability.

2. The method of claim 1, further comprising receiving the queue status from each of the job queues.

3. The method of claim 1, wherein the user intents include one or more of execution deadline, accuracy, confidence, budget, and QPU type.

4. The method of claim 1, wherein the vendor criteria include one or more of circuit requirements, real-time quantum processing unit telemetry, and runtime characteristics.

5. The method of claim 1, further comprising assigning the quantum jobs based on entanglement characteristics of the quantum processing units that match the quantum jobs.

6. The method of claim 1, further comprising splitting at least one of the quantum jobs into multiple circuits and assigning the multiple circuits to one or more of the quantum processing units.

7. The method of claim 6, further comprising aggregating results generated from executing the multiple circuits.

8. The method of claim 1, further comprising optimizing the placement recommendations and reassigning the quantum jobs to the quantum processing units.

9. The method of claim 1, wherein the quantum processing units include one or more of on-premise quantum processing units, edge based quantum processing units, and cloud based quantum processing units, wherein types include physical quantum processing units and virtual quantum processing units.

10. A non-transitory storage medium having stored therein instructions that are executable by one or more hardware processors to perform operations comprising:

consolidating, in a telemetry plane that aggregates real-time queue status from a plurality of quantum vendors, a queue status of each job queue associated with quantum processing units in the telemetry plane, wherein each of the job queues includes quantum jobs for corresponding quantum processing units, wherein the telemetry plane identifies quantum jobs for all quantum processing units and stores metadata describing the quantum jobs and characteristics of the quantum processing units including quantum processing unit type, qubits, speed, accuracy, queue wait-time, and cost;

determining characteristics for the quantum jobs represented in the queue statuses included in the telemetry plane, wherein the characteristics include runtime characteristics predicted by an estimator engine and quantum vendor-specific quantum processing unit characteristics including qubit error rates, clock speeds, and entanglement limits, wherein the estimator engine predicts runtime characteristics for the quantum jobs for different quantum processing unit configurations using the metadata stored in the telemetry plane;

evaluating user intents associated with the quantum jobs, the characteristics, and vendor criteria in combination with a scoring mechanism to generate placement recommendations for each of the quantum jobs, wherein the user intents comprise one or more of budget, execution deadline, end-to-end wait time, execution completion time, accuracy, and quantum processing unit type, and wherein the vendor criteria comprise one or more of network latency, error rate, queue wait-time, and cost;

assigning the quantum jobs to the quantum processing units associated with the placement recommendations, wherein the assigning the quantum jobs includes selectively reassigning, before execution, at least one quantum job from a first quantum processing unit associated with a first quantum vendor to a second quantum processing unit associated with a second quantum vendor based on updated placement recommendations generated using the telemetry plane metadata and the predicted runtime characteristics; and orchestrating the execution of the quantum jobs at the assigned quantum processing units, wherein the quantum jobs are executed at the assigned quantum processing units, wherein assignments of the quantum jobs are continually reevaluated and changed before execution of the quantum jobs based on changes in real-time quantum processing unit telemetry and qubit availability.

11. The non-transitory storage medium of claim 10, further comprising receiving the queue status from each of the job queues.

12. The non-transitory storage medium of claim 10, wherein the user intents include one or more of execution deadline, accuracy, confidence, budget, and QPU type.

13. The non-transitory storage medium of claim 10, wherein the vendor criteria include one or more of circuit requirements, real-time quantum processing unit telemetry, and runtime characteristics.

14. The non-transitory storage medium of claim 10, further comprising assigning the quantum jobs based on entanglement characteristics of the quantum processing units that match the quantum jobs.

15. The non-transitory storage medium of claim 10, further comprising splitting at least one of the quantum jobs into multiple circuits and assigning the multiple circuits to one or more of the quantum processing units.

16. The non-transitory storage medium of claim 15, further comprising aggregating results generated from executing the multiple circuits.

17. The non-transitory storage medium of claim 10, further comprising optimizing the placement recommendations and reassigning the quantum jobs to the quantum processing units.

18. The non-transitory storage medium of claim 10, wherein the quantum processing units include one or more of on-premise quantum processing units, edge based quantum processing units, and cloud based quantum processing units, wherein types include physical quantum processing units and virtual quantum processing units.

* * * * *